US006357156B1

(12) United States Patent
Klebes et al.

(10) Patent No.: US 6,357,156 B1
(45) Date of Patent: Mar. 19, 2002

(54) AUTHORIZATION MODULE FOR ACTIVATING A FIREARM AND METHOD OF USING SAME

(75) Inventors: John F. Klebes, Feeding Hills; Lee M. Lenkarski, Ware; Pardip K. Vaid, Northampton, all of MA (US)

(73) Assignee: Smith & Wesson Corp., Springfield, MA (US)

( * ) Notice: Subject to any disclaimer, the term of this patent is extended or adjusted under 35 U.S.C. 154(b) by 0 days.

(21) Appl. No.: 09/625,688

(22) Filed: Jul. 26, 2000

(51) Int. Cl.$^7$ .......................... F41A 17/06; F41A 17/34
(52) U.S. Cl. .................... 42/70.11; 42/70.01; 42/84
(58) Field of Search ............... 42/70.01, 70.02, 42/70.11, 84

(56) References Cited

U.S. PATENT DOCUMENTS

| | | |
|---|---|---|
| 520,468 A | 5/1894 | Wesson |
| 3,650,174 A | 3/1972 | Nelsen |
| 4,467,545 A | 8/1984 | Shaw, Jr. |
| 4,793,085 A | 12/1988 | Surawski et al. |
| 4,970,819 A | 11/1990 | Mayhak |
| 5,074,189 A | 12/1991 | Kurtz |
| 5,083,392 A | 1/1992 | Bookstaber |
| 5,272,828 A | 12/1993 | Petrick et al. |
| 5,303,495 A | 4/1994 | Harthcock |
| 5,448,847 A | 9/1995 | Teetzel |
| 5,459,957 A | 10/1995 | Winer |
| 5,502,915 A * | 4/1996 | Mendelsohn et al. ...... 42/70.11 |
| 5,603,179 A * | 2/1997 | Adams ................. 42/70.08 |
| 5,625,972 A | 5/1997 | King et al. |
| 5,704,153 A | 1/1998 | Kaminski et al. |
| 5,755,056 A | 5/1998 | Danner et al. |
| 5,799,433 A | 9/1998 | Danner et al. |
| 5,806,226 A | 9/1998 | Norton et al. |
| 5,915,936 A * | 6/1999 | Brentzel ............... 42/70.11 |
| 5,937,557 A | 8/1999 | Bowker et al. |
| 5,937,558 A | 8/1999 | Gerard |
| 6,098,330 A * | 8/2000 | Schmitt et al. ......... 42/70.11 |
| 6,185,852 B1 * | 2/2001 | Whalen et al. ......... 42/70.11 |
| 6,260,300 B1 * | 7/2001 | Klebes et al. ......... 42/70.11 |
| 6,286,242 B1 * | 9/2001 | Klebes ................. 42/84 |

* cited by examiner

Primary Examiner—Charles T. Jordan
Assistant Examiner—Kimberly S. Smith
(74) Attorney, Agent, or Firm—McCormick., Paulding & Huber LLP

(57) ABSTRACT

An authorization module is provided for activating an associated portable or hand-held electronic device such as a firearm. The authorization module includes a housing defining a cavity, and an electrical interface for communicating with the electronic firearm. The housing is preferably generally in the shape of a firearm magazine for insertion into a magazine well of the electronic firearm. A fingerprint sensor is supported on and faces outwardly of the housing for generating a fingerprint signal indicative of a fingerprint pattern detected by the fingerprint sensor. A fingerprint identification circuit is disposed within the cavity of the housing and communicates with the fingerprint sensor for receiving the fingerprint signal and for comparing the sensed fingerprint pattern with an authorized user's fingerprint pattern stored in the identification circuit. The identification circuit communicates with the electrical interface for transmitting an authorization signal to activate the firearm if the sensed fingerprint pattern substantially matches the authorized user's fingerprint pattern. The module is preferably powered by DC batteries disposed within the housing.

9 Claims, 4 Drawing Sheets

AUTHORIZATION MODULE FOR ACTIVATING A FIREARM AND METHOD OF USING SAME

Some material related to firearm security is disclosed and claimed in the following pending U.S. Patent Applications and Patent owned by the assignee of the present invention entitled "Biometrically Activated Lock and Enablement System" (U.S. Pat. No. 6,260,300); and "Semi-Automatic Pistol" (U.S. Pat. No. 5,717,156), the disclosures of which are hereby incorporated by reference.

FIELD OF THE INVENTION

This invention relates generally to a biometric personnel identification device, and more particularly to an authorization module for activating an associated electronic firearm by detecting the fingerprint of an authorized user.

BACKGROUND OF THE INVENTION

Manufacturers have recently incorporated electronic circuitry in firearms to improve their performance and reliability. One area of particular interest in firearm improvement using electronics is to prevent the use of firearms by unauthorized persons such as children or other non-owners.

A method of preventing unauthorized use is the incorporation of a fingerprint identification device with the firearm. Fingerprint identification systems generally are known in the electronics industries; however, there have been no efforts focused on providing a self-contained module adapted to a firearm for the prevention of unauthorized use of the firearm.

Therefore, it is an object of the present invention to provide a self-contained authorization module adapted for use with an electronic firearm to activate the firearm upon identification of the fingerprint pattern of an authorized user.

It is another object of the present invention to provide an authorization module which is generally in the form of a magazine cartridge for engagement with the magazine well of an associated electronic firearm.

SUMMARY OF THE INVENTION

In one aspect of the present invention, an authorization module for activating a portable or hand-held electronic device, such as a firearm, includes a housing defining a cavity, and includes an electrical interface for communicating with a firearm. A fingerprint sensor is supported on and faces outwardly of the housing for generating a fingerprint signal indicative of a fingerprint pattern detected by the fingerprint sensor. A fingerprint identification circuit is disposed within the cavity of the housing and communicates with the fingerprint sensor for receiving the fingerprint signal and for comparing the fingerprint pattern derived from the fingerprint signal with an authorized user's fingerprint pattern stored in the identification circuit. The identification circuit communicates with the electrical interface for transmitting an authorization signal to activate an associated firearm if the fingerprint pattern detected by the fingerprint sensor substantially matches the authorized user's fingerprint pattern. Preferably, the module is removably engageable with the magazine well of the associated electronic firearm.

In another aspect of the present invention, a method of activating a portable or hand-held electronic device, such as a firearm, comprises providing an authorization module including a fingerprint detector and fingerprint identification circuit. A finger in sensing position over the fingerprint sensor is detected and a fingerprint signal indicative of the detected fingerprint pattern is generated therefrom. The detected fingerprint pattern derived from the fingerprint signal is compared by means of the identification circuit with an authorized user's fingerprint pattern stored in the identification circuit. An authorization signal to be received by an associated electronic firearm to activate the firearm is generated if the fingerprint pattern detected by the fingerprint-sensor substantially matches the authorized user's fingerprint pattern.

An advantage of the present invention is that the authorization module is removably engageable with the magazine well of an associated electronic firearm to thereby retain a normal frame size of the firearm.

These and other advantages of the present invention will become more apparent in the light of the following detailed description and accompanying figures.

DETAILED DESCRIPTION OF THE PREFERRED EMBODIMENT

Figure 1:
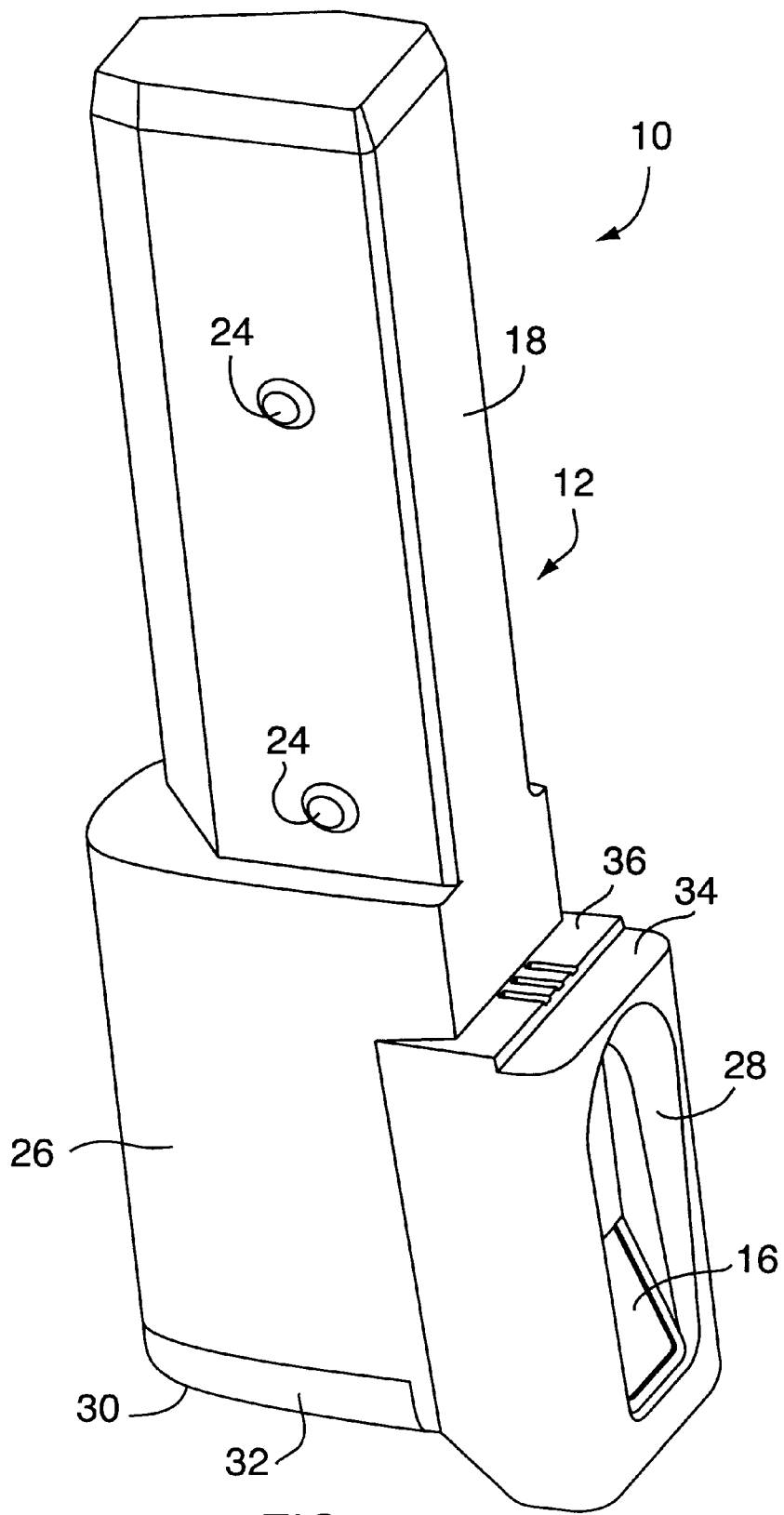
FIG. 1 is a perspective view of an authorization module embodying the present invention.

Referring to FIGS. 1–4, an authorization module embodying the present invention is generally indicated by the reference number 10. The authorization module 10 activates an associated electronically activated firearm 22 (see FIG. 4) upon sensing and identifying a fingerprint of one or more authorized users of the electronic firearm. Although the authorization module will be described with respect to an electronic firearm, the module may be employed to activate any portable or hand-held electronic device such as, for example, a nail gun or chain saw, where safety or security is a concern.

The module 10 includes a housing 12, electronic fingerprint identification circuitry 14 mounted on a circuit board, and a fingerprint sensor 16 electrically communicating with the fingerprint identification circuitry. The housing 12 is preferably injection molded from a rigid plastic or nylon material and includes a first housing half 12a and a second housing half 12b which cooperate to define an enclosed upper cavity when assembled to accommodate the fingerprint identification circuitry 14 at an upper portion 18 of the housing 12. The upper portion 18 of the housing 12 is elongated and preferably generally shaped in the form of a magazine cartridge so as to be receivable within a magazine well of the associated firearm 22. The upper portion 18 of the housing 12 has an outer surface preferably defining a plurality of projections or tabs 24,24 for frictionally engaging an opposing inner surface of the magazine well of the firearm 22 to firmly align and locate the upper portion of the housing within the magazine well. The projections 24,24 may also serve as alignment bumps which are located inside of opposing guide rails within the magazine well of the firearm 22. By employing alignment bumps, one authorization module may be employed to fit firearms of different calibers without affecting the keying of the ammunition magazines by caliber.

A lower portion 26 of the housing 12 to extend outwardly of the magazine well of the electronic firearm 22 defines a fingerprint guide 28 for slidably receiving and aligning a finger of an authorized firearm user into overlying registration with the fingerprint sensor 16. Specifically, the fingerprint guide 28 is an elongated channel accommodating the fingerprint sensor 16 and having a width slightly larger than that of a human finger for accurately directing the finger of the user into proper sensing position over the fingerprint sensor 16.

Figure 2:
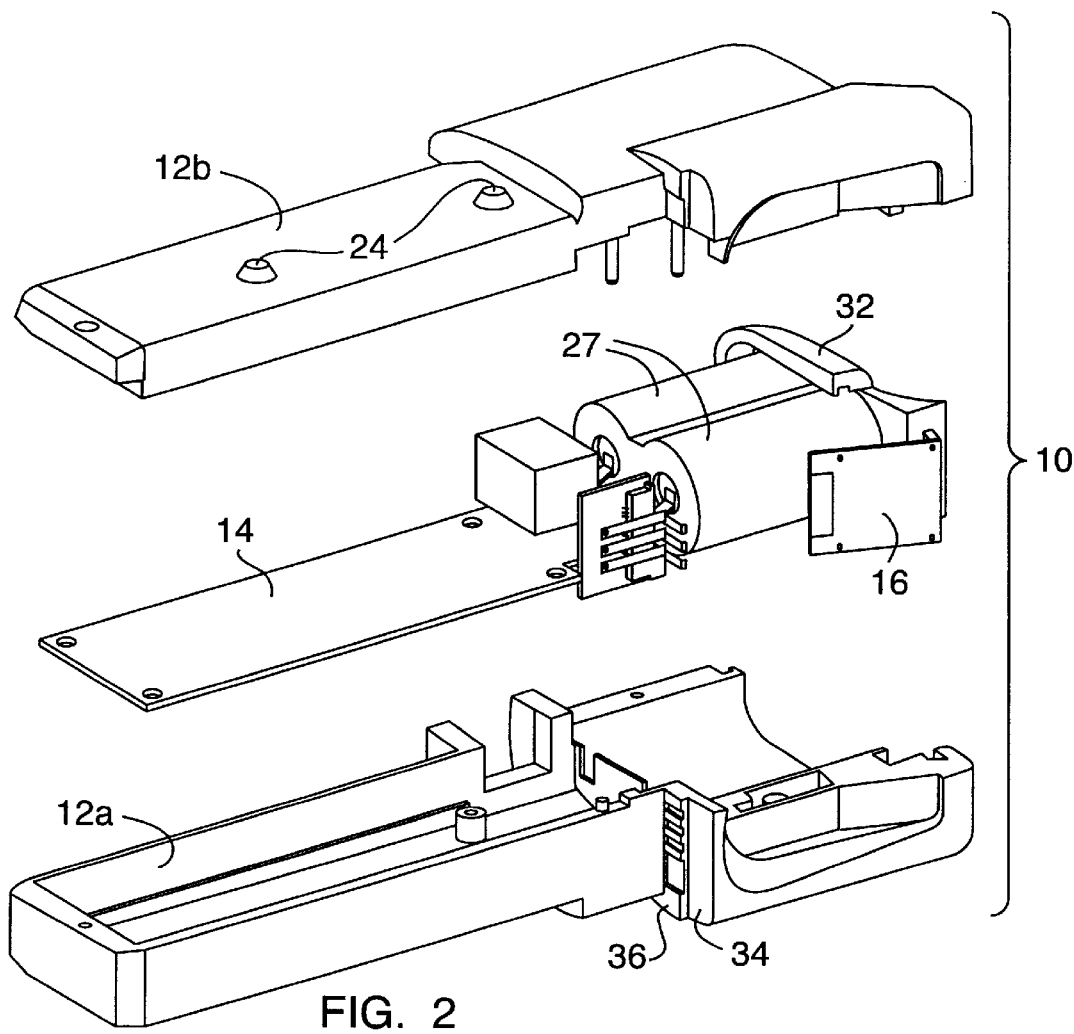
FIG. 2 is a disassembled perspective view of the authorization module of FIG. 1.
Figure 4:
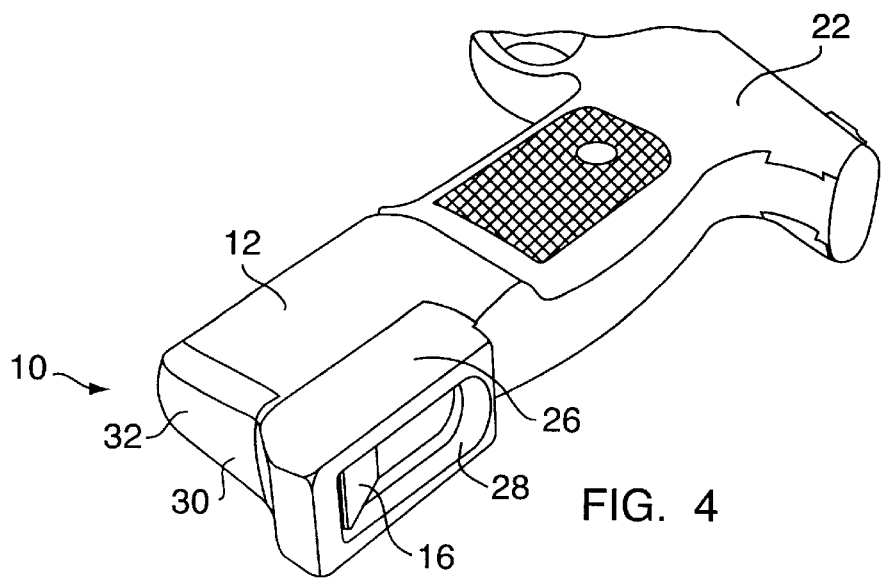
FIG. 4 is a perspective view of the authorization module of FIG. 1 engaged with a magazine well of an electronic firearm.
Figure 3:
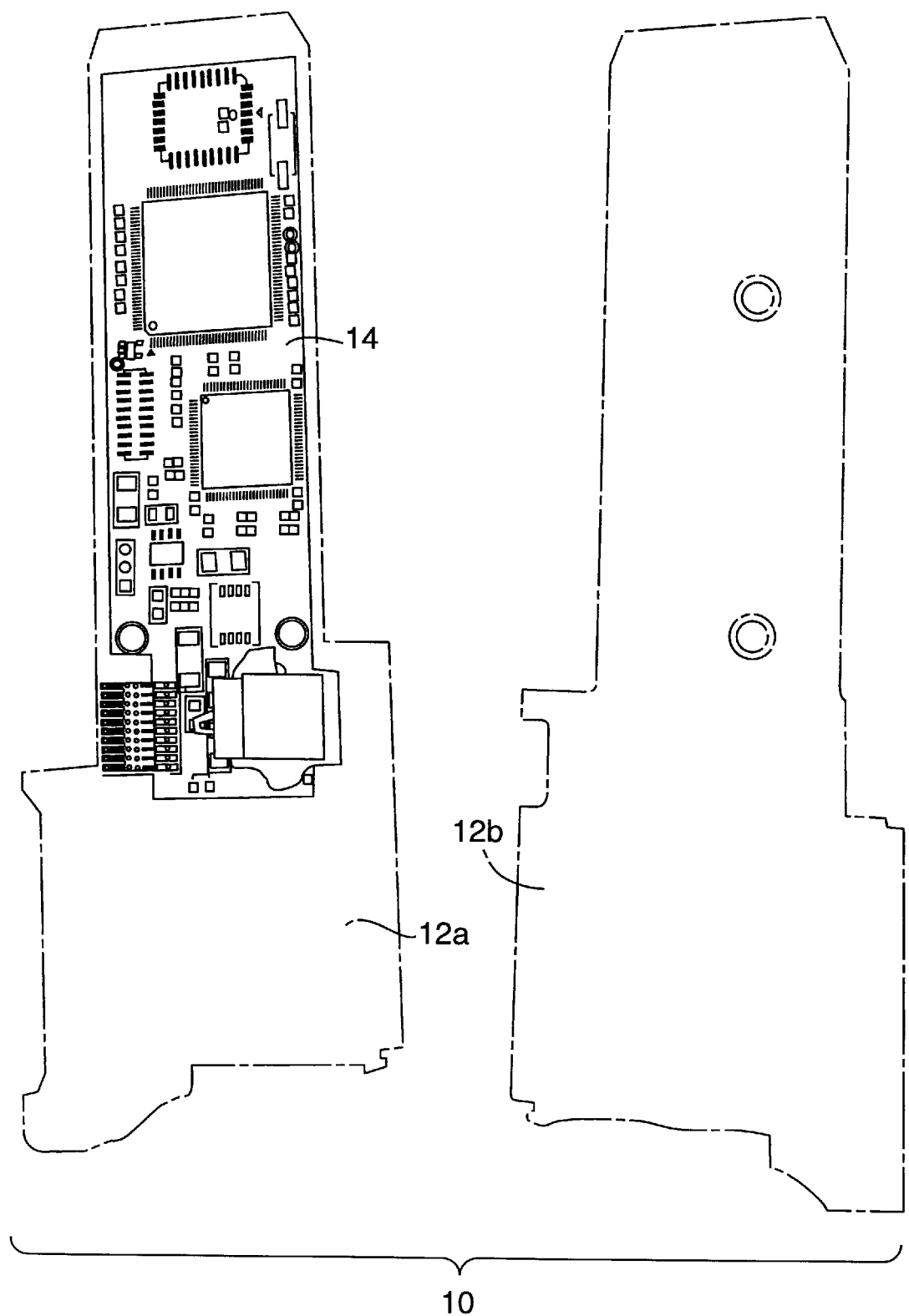
FIG. 3 is a plan view of the authorization module of FIG. 1 with the housing open.

The first and second housing halves 12a and 12b further cooperate at a lower portion 26 of the housing to form a lower cavity or well for accommodating one or more batteries, such as a pair of DC batteries 27 as shown in FIG. 2. The DC batteries 27 are electrically coupled to the fingerprint sensor 16 and the fingerprint identification circuitry 14 for energizing the sensor and circuitry. A bottom end 30 of the housing 12 defines a battery cover 32 which is removable to expose the lower cavity in order to insert or replace the batteries 27.

The fingerprint identification circuitry 14 mounted on the circuit board is conventional circuitry including biometric recognition algorithms for comparing one or more authorized users' fingerprint patterns stored therein with fingerprint patterns carried by signals transmitted to the circuitry from the fingerprint sensor 16. For example, the fingerprint identification circuitry 14 may be provided by Infineon Technologies Corporation, and includes an extensive library of biometric recognition algorithms that enable fast, accurate comparisons of stored user fingerprint patterns and those captured by the fingerprint sensor 16.

The fingerprint sensor 16 is in the form of an integrated circuit (IC) chip which is available from several manufacturers. For purposes of illustration only, an example of an IC fingerprint sensor manufactured by Infineon Technologies Corporation employs standard CMOS technology and has a size of 18 mm×21 mm×1.5 mm. The Infineon Technologies sensor includes an embedded 288×224 pixel contact sensor array of capacitive sensing elements which accurately measure the exact local distance between the finger skin and the chip surface with a resolution of about 500 dpi. As a result, the fingerprint sensor images the lines and ridges of a human fingerprint when a user touches the sensor surface. Each pixel has an 8-bit data depth, enabling evaluation of subtle gradations (256 shades of gray) of a fingertip and their translation into a set of indices—the key identifying features of an individual fingerprint. The features of a sensed fingerprint include detailed information such as line endings, branching points and whorls. Data is digitized on the fingerprint sensor chip and transmitted via a standard interface to the fingerprint identification circuitry 14. The fingerprint identification circuitry 14, in turn, extracts from the sensed fingerprint features one to two dozen characteristic points—such as branching points—and compares such features with corresponding features of one or more authorized user's fingerprints stored in the fingerprint identification circuitry for positively identifying an authorized user to activate the associated electronic firearm 22. As mentioned above, the identification algorithms just described are those used by Infineon Technology, and are described only by way of example. The conventional identification circuitry will vary in the way it identifies a fingerprint pattern based on the manufacturer of the identification circuitry.

Imaging and data transfer of a fingerprint impression on the fingerprint sensor chip takes about 100 milliseconds. The IC sensor also incorporates electrostatic discharge (ESD) protection features so that the sensor is able to withstand static electricity jolts of up to 8 kilovolts. The sensor's packaging is designed for low-cost end product manufacturing and high reliability.

The housing 12 defines a projection or ledge 34 generally separating the upper portion 18 from the lower portion 26 of the housing. A terminal block 36 is disposed on the ledge 34 and includes three electrical terminals for engaging a complementary arrangement of terminals (not shown) on the associated electronic firearm 22 when the module 10 is engaged with the magazine well of the firearm. Two of the electrical terminals provide electrical power and ground from the authorization module 10 to the firearm 22, and the third terminal transmits signals carrying activation data to the firearm 22 for activating the firearm when a fingerprint pattern is sensed by the sensor 16 and substantially matches an authorized user's fingerprint pattern stored in the fingerprint identification circuitry 14.

Preferably, communication is based on the Dallas Semiconductor MicroLAN 1-Wire component protocol which is a conventional, well documented, low cost network protocol for communicating digitally over a one wire microcontroller based network. The actual protocol is defined by Dallas MicroLAN's specifications. Using the MicroLAN Design Guide commands are defined that power up, power down and control other communications between the firearm 22 and the authorization module 10. The authorization module 10 may support "twinning" which means that each module will work with only one firearm and uniquely twins with the firearm at the time of first use. After first use, the authorization module and firearm only work in that matched pair. In other words, the authorization module will not work with any other firearm, and the firearm will not work with any other authorization module.

Secure communications between the authorization module 10 and the associated firearm 22 is accomplished by using a pseudo-random number similar to that used in keyless entry systems in order to create a changing access code to prevent eavesdropping. Further, two special service modes may be provided including a first mode to untwin the authorization module by the factory, and a second mode for testing at the factory.

In operation, the authorization module 10 is engaged with the magazine well of the associated electronic firearm 22 which cannot be activated until a fingerprint pattern of one or more authorized users is sensed and identified by the module. To activate the firearm 22, the upper portion 18 of the module housing 12 is inserted in the magazine well of the electronic firearm. When inserted, the fingerprint identification circuitry 14 of the module 10 is electrically coupled via the terminal block 36 to activation circuitry (not shown) in the associated electronic firearm 22. Further, the lower portion 26 of the housing 12 extends outwardly of the magazine well such that the fingerprint sensor 16 mounted on the lower portion is readily accessible to the firearm user for fingerprint identification.

The user of the associated electronic firearm 22 uses the fingerprint guide 28 to direct and align his or her finger into proper sensing position over, and preferably in contact with, the fingerprint sensor 16. The fingerprint sensor 16 senses the fingerprint and generates a digital signal carrying the fingerprint pattern information to the fingerprint identification circuitry 14 where the circuitry compares the sensed fingerprint pattern with one or more authorized users' fingerprint patterns stored in the circuitry.

If the sensed fingerprint pattern does not substantially match any of the authorized fingerprint patterns stored in the fingerprint identification circuitry 14, the circuitry will not generate and transmit an authorization signal via the third terminal of the terminal block 36 to the associated electronic firearm 22, and as a result the firearm will be inoperable when the module 10 is removed and replaced by a magazine cartridge.

If the sensed fingerprint pattern does substantially match any of the authorized users' fingerprint patterns stored in the fingerprint identification circuitry 14, the circuitry will generate and transmit an authorization signal via the third terminal of the terminal block 36 to the associated electronic firearm 22 such that the firearm is activated. The module 10 is then disengaged from the magazine well of the firearm 22 and replaced by a magazine cartridge so that the firearm is ready to operate. Preferably, the electronic firearm 22 includes circuitry which will deactivate the firearm after a predetermined period of time has elapsed after activation and/or nonuse.

Figure 5:
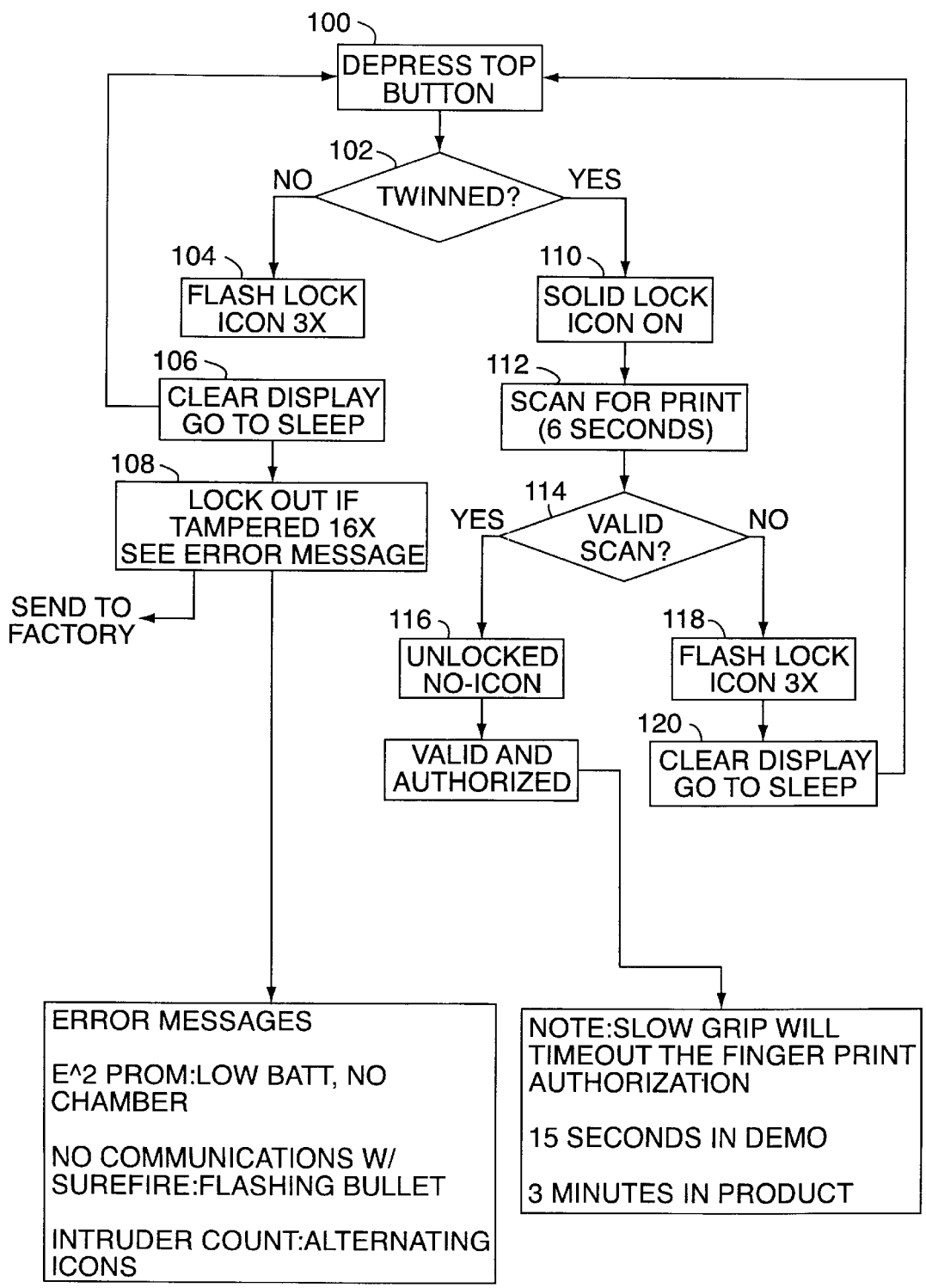
FIG. 5 is a flow diagram illustrating an example of an authorization routine for activating an electronic firearm.

FIG. 5 is a flow diagram illustrating an example of an authorization routine for the operation of an associated electronically activated firearm. A button on the grip of the firearm is depressed to begin the authorization routine (step 100). The fingerprint identification circuitry 14 determines whether the authorization module 10 is untwinned or twinned with the firearm to be activated (step 102). If the authorization module 10 is untwinned with the firearm to be activated or twinned with a different firearm, the authorization module will preferably flash a lock icon a predetermined number of times to indicate that the module and firearm are untwinned (step 104). Consequently, the firearm will not be activated. The display on the authorization module 10 will then be cleared and the firearm will "go to sleep" at step 106 (i.e., enter a power down mode). The authorization module will generate a permanent lock-out of the firearm if the authorization module is tampered with a predetermined number of times (step 108). Error messages may be displayed on the firearm to indicate a lock-out condition. When lock-out occurs, the authorization module 10 could be required to be sent to the factory in order to remove the lock-out condition. Alternatively, the lock-out state might be in effect only for a predetermined time period, such as three hours. Once the time period expires the lock-out state is removed thereby permitting the user to again attempt to activate the firearm.

If the fingerprint identification circuitry 14 determines that the authorization module 10 is twinned with the firearm 22 to be operated (step 102), the authorization module will preferably display a solid lock or other appropriate icon to indicate twinning during a locked condition (step 110). The authorization module 10 will then scan a predetermined length of time to detect a fingerprint (step 112). The fingerprint identification circuitry 14 then determines whether an authorized fingerprint has been scanned (step 114). If the scan detects an authorized fingerprint the authorization module 10 will activate the firearm and remove the lock icon from the display (step 116). If a fingerprint is not scanned within the predetermined period or the detected fingerprint is not an authorized fingerprint, the lock icon will flash a predetermined number of times to indicate failure to activate the firearm (step 118). The display will then be cleared and the firearm will go to power down mode (step 120).

Although the invention has been shown and described in a preferred embodiment, it should be understood that numerous modifications can be made without departing from the spirit and scope of the present invention. For example, the authorization module may be employed for activating any portable or hand-held electronic device, such as a nail gun or chain saw, where safety or security is a concern. Accordingly, the present invention has been shown and described by way of illustration rather than limitation.

We claim:

1. An authorization module for activating a firearm, the module comprising:

a housing defining a cavity, and including an electrical interface for communicating with an electronic device, said housing being in the shape of a firearm magazine for insertion into a magazine well of a firearm;

a fingerprint sensor supported on and facing outwardly of the housing for generating a fingerprint signal indicative of a fingerprint pattern detected by the fingerprint sensor; and a fingerprint identification circuit disposed within the cavity of the housing and communicating with the fingerprint sensor for receiving the fingerprint signal and for comparing the fingerprint pattern derived from the fingerprint with an authorized user's pattern stored in the identification circuit, the identification circuit communicating with the electrical interface for transmitting an authorization signal to activate an associated electronic device if the sensed fingerprint pattern substantially matches the authorized user's fingerprint pattern.

2. An authorization module as defined in claim 1, wherein the housing defines projections extending outwardly therefrom for frictionally engaging an inner surface of the magazine well of a firearm to secure the housing to the firearm.

3. An authorization module as defined in claim 1, wherein the housing includes a longitudinal portion to extend outwardly of a firearm when the housing is inserted into a magazine well of a firearm, the longitudinal portion accommodating the fingerprint sensor.

4. An authorization module as defined in claim 1, wherein the fingerprint sensor is a biometric fingerprint sensor.

5. An authorization module as defined in claim 1, further including a replaceable and/or rechargeable power supply disposed in the cavity of the housing for powering the fingerprint identification circuit.

6. An authorization module as defined in claim 1, wherein the housing has an outer surface defining a recess accommodating the fingerprint sensor, the recess having a width slightly larger than that of a human finger for guiding a finger into a sensing position over the fingerprint sensor.

7. An authorization module as defined in claim 1, wherein the electrical interface includes a terminal block having electrical terminals for engaging complementary electrical terminals of an electronic device to transmit an authorization signal to the device.

8. A method of activating a firearm comprising the steps of:

providing a fingerprint authorization module including a fingerprint sensor and a fingerprint identification circuit, said authorization module being in the shape of a firearm magazine for insertion into a magazine well of the firearm;

detecting a fingerprint pattern of a finger in sensing position over the fingerprint sensor and generating therefrom a fingerprint signal indicative of the sensed fingerprint pattern;

comparing by means of the identification circuit the sensed fingerprint pattern with an authorized user's fingerprint pattern stored in the identification circuit; and generating an authorization signal to be received by an associated electronic device to activate the device if the sensed fingerprint pattern substantially matches the authorized user's fingerprint pattern.

9. A method as defined in claim 8, wherein the step of detecting includes biometrically detecting a fingerprint pattern.

* * * * *